United States Patent
Goto et al.

(10) Patent No.: US 8,206,623 B2
(45) Date of Patent: Jun. 26, 2012

(54) PROCESS FOR PRODUCING CERAMIC FINE PARTICLES, AND CERAMIC FINE PARTICLE PRODUCING APPARATUS USED THEREIN

(75) Inventors: Hiroyuki Goto, Hadano (JP); Hideo Uemoto, Hadano (JP); Tomoki Sugino, Hadano (JP)

(73) Assignee: Covalent Materials Corporation, Tokyo (JP)

( * ) Notice: Subject to any disclaimer, the term of this patent is extended or adjusted under 35 U.S.C. 154(b) by 371 days.

(21) Appl. No.: 12/438,249

(22) PCT Filed: Aug. 27, 2008

(86) PCT No.: PCT/JP2008/065277
§ 371 (c)(1),
(2), (4) Date: Feb. 20, 2009

(87) PCT Pub. No.: WO2009/098795
PCT Pub. Date: Aug. 13, 2009

(65) Prior Publication Data
US 2010/0219544 A1  Sep. 2, 2010

(30) Foreign Application Priority Data
Feb. 8, 2008 (JP) .................................. 2008-028402

(51) Int. Cl.
*B29B 9/00* (2006.01)
(52) U.S. Cl. ................................. 264/13; 264/5; 264/11
(58) Field of Classification Search ................ 264/5, 11, 264/13
See application file for complete search history.

(56) References Cited

U.S. PATENT DOCUMENTS
2010/0021734 A1* 1/2010 Uemoto et al. ............... 428/402
2010/0224277 A1* 9/2010 Witz et al. ..................... 138/149

FOREIGN PATENT DOCUMENTS
| JP | 5-192907 | * | 8/1993 |
| JP | 2004-059802 A | | 2/2004 |
| JP | 2004-122107 A | | 4/2004 |
| JP | 2005-174711 A | | 6/2005 |
| JP | 2006-315871 A | | 11/2006 |
| WO | WO 01/32147 | * | 10/2001 |

OTHER PUBLICATIONS
Machine Translation of JP 5-192907.*

* cited by examiner

*Primary Examiner* — Matthew Daniels
*Assistant Examiner* — Russell Kemmerle, III
(74) *Attorney, Agent, or Firm* — Foley & Lardner LLP

(57) ABSTRACT

Provided are a ceramic-fine-particle producing process making it possible to produce, with ease, ceramic fine particles which have a spherical shape close to a complete round and an excellent mono-dispersibility, and are made only of a solid component of a simple ceramic material without making a fine channel structure complicated, and an apparatus used therein for producing ceramic fine particles. The process includes the step (S100) of feeding a dispersion phase made of an aqueous liquid containing a gelling agent to act upon cooling and a ceramic material into a continuous phase made of an oily liquid containing a surfactant, thereby producing fine droplets; the step (S110) of collecting and cooling the produced fine droplets; the step (S120) of washing the cooled fine droplets; the step (S130) of drying the washed fine droplets; and the step (S140) of firing the dried fine droplets.

7 Claims, 3 Drawing Sheets

PROCESS FOR PRODUCING CERAMIC FINE PARTICLES, AND CERAMIC FINE PARTICLE PRODUCING APPARATUS USED THEREIN

TECHNICAL FIELD

The present invention relates to a process for producing ceramic fine particles, and an apparatus used therein for producing ceramic fine particles.

BACKGROUND ART

In recent years, solid fine particles having a particle diameter of several micrometers to several hundreds of micrometers (hereinafter referred to merely as fine particles) have been used for a preparatively-isolating/separating column filler or other articles.

As a process for producing fine particles made of resin (hereinafter referred to as resin fine particles) out of such particles, known is, for example, a technique of introducing two liquids (a continuous phase and a dispersion phase) into a fine channel having an intersection to produce fine droplets, and solidifying the produced fine droplets by irradiation with light, heating, cooling or the like, as described in, for example, Patent Document 1.

In order to solve a problem that when fine droplets produced in a fine channel are collected into a beaker or the like outside the fine channel structure and then cured, the particle diameters of the cured fine particles are largely varied, the following technique is known as a process for producing resin fine particles: a technique of producing fine droplets in a junction of fine channels, and radiating light onto the droplets or heating the droplets immediately after the production, thereby curing the fine droplets in a dispersing channel in the structure of the fine channels, as described in, for example, Patent Document 2.

As a process for producing ceramic fine particles made of a ceramic (hereinafter referred to as ceramic fine particles) out of the above-mentioned fine particles, known is a technique using a spray drying method (disclosed in, for example, Patent Document 3), a physically pulverizing method (disclosed in, for example, Patent Document 4), or some other method.

Patent Document 1: Japanese Patent Application Laid-Open No. 2004-59802
Patent Document 2: Japanese Patent Application Laid-Open No. 2004-122107
Patent Document 3: Japanese Patent Application Laid-Open No. 2006-315871
Patent Document 4: Japanese Patent Application Laid-Open No. 2005-174711

DISCLOSURE OF THE INVENTION

Problems to be Solved by the Invention

However, about ceramic fine particles produced by the spray drying method or the physically pulverizing method described in Patent Document 3 or 4, particles in the form of a sphere close to a complete round are not easily produced. Thus, there remains a problem that the shape thereof is distorted (or the shape is bad), and uniform particle diameters cannot be obtained so that the particle diameter distribution is poor.

When the form of the fine particles departs from the form of a sphere so as to become bad, the fluidity of the fine particles deteriorates. Thus, when the fine particles are used as, for example, a filler, there is caused a problem that the fillability thereof deteriorates. Moreover, such ceramic fine particles are poor in dispersibility; thus, the particles have a problem that various classifying steps are required to make the dispersibility good so that the production process gets complicated and further the yield is also poor.

To practical use is also put a method of combining a sol-gel process with suspension polymerization or emulsion polymerization to produce silica gel having particle diameters from submicron sizes to several tens of micrometers. However, this method has a problem that it is difficult to produce effectively ceramic fine particles having particle diameters not less than the above-mentioned diameters.

According to the process using a fine channel to produce fine particles as described in above-mentioned Patent Document 1 or 2, a success is made in making resin fine particles into a spherical form. However, no examples are demonstrated wherein ceramic fine particles, in particular, ceramic fine particles made only of a solid component of a simple ceramic material are made spherical. It is said that the attainment of such a matter is difficult.

Additionally, in a case of producing fine droplets in a junction of fine channels and further radiating light onto the droplets or heating the droplets just after the production as described in Patent Document 2, it is indispensable to adopt various means (a mask in the case of the light radiation, or a heat insulating material or the like in the case of the heating) in such a manner that the dispersion phase is not cured before the production of the fine droplets. Thus, there also arises a problem that the structure of the fine channels gets complicated.

Thus, the invention has been made in light of the above-mentioned problems, and an object thereof is to provide a ceramic-fine-particle producing process making it possible to produce, with ease, ceramic fine particles which have a spherical shape close to a complete round and an excellent mono-dispersibility, and are made only of a solid component of a simple ceramic material without making a fine channel structure complicated, and an apparatus used therein for producing ceramic fine particles.

Means for Solving the Problems

The process according to the invention for producing ceramic fine particles includes: feeding a dispersion phase comprising an aqueous liquid containing a gelling agent to act upon cooling and a ceramic material into a continuous phase comprising an oily liquid containing a surfactant, thereby producing fine droplets; collecting the produced fine droplets; cooling the fine droplets; removing the continuous phase components; and then firing the fine droplets.

The invention has this structure, thereby making it possible to produce, with ease, ceramic fine particles which have a spherical shape close to a complete round and an excellent mono-dispersibility, and are made only of a solid component of a simple ceramic material without making the fine channel structure complicated.

In detail, the process according to the present invention for producing ceramic fine particles includes the step of producing fine droplets by feeding a dispersion phase comprising an aqueous liquid containing a gelling agent to act upon cooling and a ceramic material into a continuous phase comprising an oily liquid containing a surfactant, the step of collecting the produced fine droplets, and cooling the droplets, the step of washing the cooled fine droplets, the step of drying the washed fine droplets, and the step of firing the dried fine droplets.

The invention has this structure, thereby making it possible to produce, with ease, ceramic fine particles which have a spherical shape close to a complete round and an excellent mono-dispersibility, and are made only of a solid component of a simple ceramic material without making the fine channel structure complicated.

As the gelling agent, agar is preferably used.

The embodiment has this structure, thereby making it possible to cure the fine droplets rapidly when the produced fine droplets are cooled; therefore, a strong gel in the form of spheres which are close to complete rounds can be formed without deteriorating the shape of the fine droplets.

In a case where agar is used as the gelling agent, the production of the fine droplets is preferably performed in a heated environment.

The embodiment has this structure, thereby making it possible to prevent the dispersion phase containing agar from being solidified before the production of the fine droplets, so as to produce the fine droplets effectively.

The apparatus according to the invention for producing ceramic fine particles includes: a fine channel structure for feeding a dispersion phase comprising an aqueous liquid containing a gelling agent to act upon cooling and a ceramic material into a continuous phase comprising an oily liquid containing a surfactant, thereby producing fine droplets; a continuous phase supplying unit for supplying the continuous phase into the fine channel structure; a dispersion phase supplying unit for supplying the dispersion phase into the fine channel structure; a collecting unit for collecting the fine droplets produced in the fine channel structure; a cooling unit for cooling the fine droplets collected in the collecting unit; a washing unit for washing the fine droplets cooled in the cooling unit; and a drying unit for drying the fine droplets washed in the washing unit.

The invention has this structure, thereby making it possible to produce, with ease, ceramic fine particles which have a spherical shape close to a complete round and an excellent mono-dispersibility, and are made only of a solid component of a simple ceramic material without making the fine channel structure complicated.

When agar is used as the gelling agent, it is preferred that the apparatus further has a heating unit for heating the fine channel structure, the continuous phase supplying unit, and the dispersion phase supplying unit.

The embodiment has this structure, thereby making it possible to prevent the dispersion phase containing agar from being solidified before the production of the fine droplets, so as to produce the fine droplets effectively.

Effect of the Invention

According to the invention, provided are a ceramic-fine-particle producing process making it possible to produce, with ease, ceramic fine particles which have a spherical shape close to a complete round and an excellent mono-dispersibility, and are made only of a solid component of a simple ceramic material without making the fine channel structure complicated, and an apparatus used therein for producing ceramic fine particles.

EXPLANATION OF THE REFERENCE NUMERALS

Figure 1:
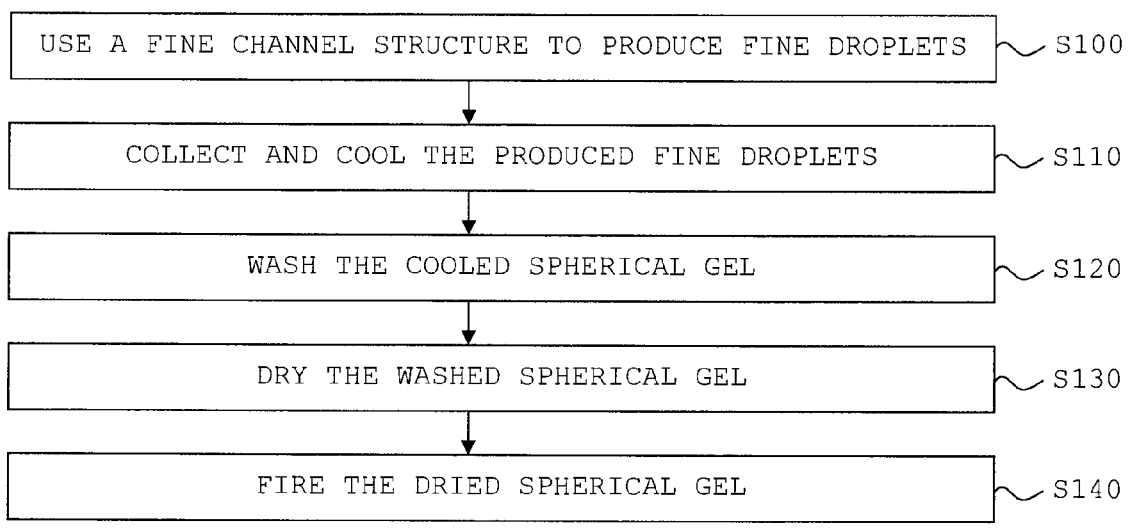
FIG. 1 is a flowchart of individual steps illustrating a process according to an embodiment of the invention for producing ceramic fine particles.

1 Apparatus for producing ceramic fine particles
10 Fine droplet producing unit
20 Fine channel structure
30 Continuous phase supplying unit
40 Dispersion phase supplying unit
50 Heating unit
60 Fine droplet collecting unit
90 Fine droplet cooling unit
100 Fine droplet washing unit
120 Fine droplet drying unit

BEST MODE FOR CARRYING OUT THE INVENTION

With reference to the drawings, the invention will be described in detail hereinafter.

FIG. 1 is a flowchart of individual steps illustrating a process according to the present embodiment for producing ceramic fine particles.

As illustrated in FIG. 1, in the process according to the invention for producing ceramic fine particles, a well-known fine channel structure is first used to produce fine droplets (S100: a fine droplet producing step).

In the fine droplet producing step S100, a continuous phase and a dispersion phase are supplied through, for example, different paths, into a fine channel of the well-known fine channel structure, so that the dispersion phase is fed into the continuous phase in a junction where the continuous phase and the dispersion phase are jointed to each other, whereby the dispersion phase is continuously sheared, so as to produce fine droplets having a spherical shape close to a complete round and made of the dispersion phase excellent in mono-dispersibility.

The continuous phase used in this fine droplet producing step S100 is made of an oily liquid containing a surfactant. In a case where the oily liquid contains no surfactant, it is difficult to produce continuously fine droplets in the form of a sphere close to a complete round when the dispersion phase is continuously sheared. The oily liquid may be, for example, isoparaffin. The surfactant may be, for example, sorbitan trioleate. The continuous phase may be, for example, a phase containing a surfactant in an amount of about 4% by weight of an oily liquid.

The dispersion phase used in this fine droplet producing step S100 is made of an aqueous liquid containing a gelling agent to act (be solidified) upon cooling, and a ceramic material.

As the gelling agent, an aqueous gelling agent is used. The material thereof is not particularly limited as far as the material is a material that is burned and gasified in a firing step that will be described later. It is preferred to use agar since the gelation rate thereof is large and even a small amount thereof gives a large gelation strength. In particular, highly pure agarose obtained by purifying agar is more preferred from the viewpoint of purity.

When agar is cooled, agar can form a strong gel rapidly even when the amount thereof is as small as several percent. Thus, in a cooling step which will be described later, a strong gel in the form of spheres can easily be produced in the state that the spheres are close to complete rounds without deteriorating the shape of the fine droplets, which are produced by the use of the fine channel structure and each have a spherical shape close to a complete round.

As the ceramic material, ceramic superfine particles are used. The superfine particles referred to herein are particles having a smaller particle diameter than the particle diameter of finally produced ceramic fine particles, and denote fine particles having primary or secondary particles having a particle diameter from, for example, the order of nanometers to several micrometers. The material of the ceramic superfine particles is not particularly limited as far as the material is a material the predetermined amount of which can be dispersed in or mixed with the gelling agent. However, when carbon contained in the gelling agent (for example, agar), which will be a binder, needs to be removed, an oxide ceramic material, which can be fired in an oxygen-containing atmosphere, can be used. When it is allowable that several percent of carbon contained in the gelling agent (for example, agar) is contained, a non-oxide ceramic material may be used. In the case of using, in particular, water-soluble carbon black or ceramic superfine particles of a metal carbide type, the material can be preferably used since the above-mentioned carbon is used as a part of the raw material. The ceramic superfine particles used herein may be particles produced by a well-known method (for example, the wet synthesis process or the physically pulverizing method).

In the case of using agar as the gelling agent, it is preferred that in the fine droplet producing step S100, the production of the fine droplets is performed in a heated environment. This manner makes it possible to prevent the dispersion phase containing agar from being solidified before the production of the fine droplets so as to produce the fine droplets effectively.

As described above, in the case of using agar as the gelling agent, it is preferred to perform the production in a heated environment; however, it is suitably set in accordance with the material of the gelling agent whether or not the production is performed in a heated environment.

The well-known fine channel structure may be, for example, a structure wherein a fine channel having a width of about 20 to 100 μm in the cross section direction and a height of about 20 to 100 μm is formed. About the fine channel structure, the inner surface of the fine channel is preferably hydrophobic since the dispersion phase used to form the fine droplets is aqueous. When the fine channel inner surface is hydrophilic, a bad effect is produced onto the flow of the dispersion phase in the fine channel so that fine droplets in the form of a sphere close to a complete round are not easily produced.

Next, the produced fine droplets are collected and cooled (S110: a fine droplet cooling step).

In this fine droplet cooling step S110, the fine droplets produced in the fine channel structure in the fine droplet producing step S100 are discharged to the outside of the fine channel structure. For example, a collecting container is used to collect the droplets together with the continuous phase, and then the collected fine droplets are cooled. Since the dispersion phase contains gelling agent to act upon cooling, the cooling causes the gelling agent contained in the fine droplets to be solidified, whereby the whole of the fine droplets is solidified to turn to a gel in the form of spheres.

In this way, in the fine droplet cooling step S110, the fine droplets produced in the fine channel structure are collected in the outside thereof, and the collected fine droplets are cooled; accordingly, a strong gel in the form of spheres can easily be produced in the state that the spheres are closed to complete rounds without making the fine channel structure itself complicated nor deteriorating the shape of the fine droplets, in the spherical form close to a complete round, produced by the use of the fine channel structure.

In a case where the fine droplets produced in the fine channel structure are cooled in the fine channel structure so as to be solidified, it is necessary to set up a heating means or the like newly so as not to solidify the dispersion phase supplied into the fine channel before the production of the fine droplets. As a result, the fine channel structure itself becomes complicated. Thus, the case is not preferred.

The temperature at which this fine droplets are cooled is timely set dependently on the used gelling agent. In the case of using agar as the gelling agent, it is preferred to cool the fine droplets to 10° C. or lower.

In this fine droplet cooling step S110, the produced fine droplets may be cooled while collected, or may be cooled after collected. It is preferred to conduct the cooling treatment quickly; therefore, needless to say, it is more preferred that the produced fine droplets are cooled while collected.

Next, the cooled fine droplets (spherical gel) are washed (S120: a fine droplet washing step).

In this fine droplet washing step S120, the continuous phase component used in the fine droplet producing step S100 (the oily liquid component containing the surfactant), in particular, the surfactant component is removed. In a main example of the method therefor, a solvent such as ethanol is supplied into the collecting container wherein the fine droplets are collected and cooled to substitute, in the container, the continuous phase collected together with the fine droplets with the solvent. When this treatment is conducted, water contained in the fine droplets is also substituted with the solvent.

Next, the washed spherical gel (gel spheres) is dried to yield spherical ceramic formed bodies (S130: a fine droplet drying step).

In this fine droplet drying step S130, the solvent used in the fine droplet washing step S120 is removed. In a main example of the method therefor, the solvent in the collecting container, which undergoes the solvent-substitution, is vacuum-dried under a reduced pressure, so as to be evaporated and removed. In this way, spherical ceramic formed bodies are yielded.

Lastly, the dried spherical gel, that is, the spherical ceramic formed bodies are fired (S140: a fine droplet firing step).

In this fine droplet firing step S140, the spherical ceramic formed bodies are fired, thereby firing and gasifying the gelling agent contained in the spherical ceramic formed bodies. As a result, the gelling agent is removed from the inside of the spherical ceramic formed bodies to yield spherical ceramic sintered bodies made only of the solid component of the ceramic material.

The atmospheric gas and the firing temperature used when this firing is conducted are timely set dependently on the material of the used gelling agent and the used ceramic material. In the case of using agar as the gelling agent, the agar can be suitably removed from the insides of the spherical ceramic formed bodies by firing the formed bodies in an oxygen atmospheric gas. In order to remove metal impurities contained in the agar, it is also effective to fire the formed bodies in a hydrogen atmosphere.

When the firing temperature is controlled dependently on the ceramic material used in the dispersion phase or the particle diameter thereof, the structure of the produced ceramic fine particles can be controlled into any structure from porous bodies to dense bodies.

As described above, the process according to the invention for producing ceramic fine particles has the above-mentioned individual steps; therefore, it is possible to produce, with ease, ceramic fine particles which have a spherical shape close to a complete round and an excellent mono-dispersibility, and are made only of a solid component of a simple ceramic material without making the fine channel structure complicated.

In a case where the collected fine droplets are directly fired without conducing the fine droplet washing step S120, the individual fine droplets are aggregated and bonded to each other so that the shape of the fine droplets themselves deteriorates largely. Thus, the case is not preferred.

Preferably, after the fine droplet washing step S120 and before the fine droplet drying step S130, the process of the invention further has the step of coating the spherical gel washed in the fine droplet washing step S120 with an oily component.

In an example of the method for coating the spherical gel with this oily component, the oily component such as isoparaffin is supplied into the collecting container, the inside of which is substituted with the solvent such as ethanol, in the fine droplet washing step S120, thereby substituting the solvent with the oily component.

Thereafter, the spherical gel coated with the oily component is caused to undergo a fine droplet drying step S130 to remove the solvent component and the oily component. Thereafter, the gel is caused to undergo a fine droplet firing step S140, thereby making it possible to prevent the shape of the spherical ceramic formed bodies from deteriorating in the fine droplet firing step S140 to yield ceramic fine particles closer to a spherical shape.

Figure 2:
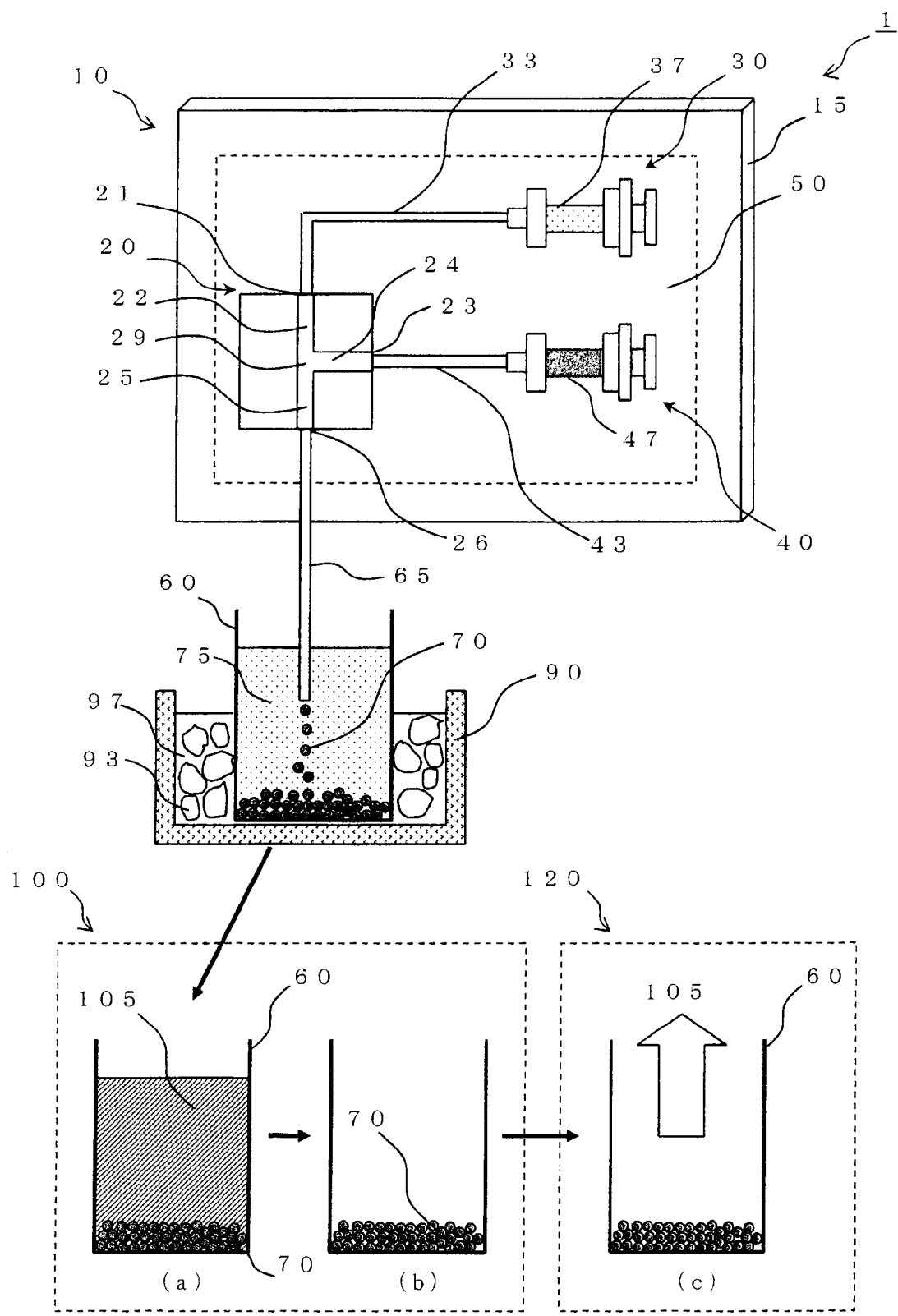
FIG. 2 is a conception view for explaining an apparatus according to an embodiment of the invention for producing ceramic fine particles.

The following will describe an apparatus used in the above-mentioned ceramic-fine-particle producing process for producing ceramic fine particles. FIG. 2 is a conception view for explaining an apparatus according to an embodiment of the invention for producing ceramic fine particles.

As illustrated in FIG. 2, an apparatus 1, which is the ceramic-fine-particle producing apparatus according to the present embodiment, is provided with a fine droplet producing unit 10, a fine droplet collecting unit 60, a fine droplet cooling unit 90, a fine droplet washing unit 100, and a fine droplet drying unit 120.

The fine droplet producing unit 10 has a fine channel structure 20 for feeding a dispersion phase into a continuous phase, thereby producing fine droplets, a continuous phase supplying unit 30 for supplying the continuous phase into the fine channel structure 20, and a dispersion phase supplying unit 40 for supplying the dispersion phase into the fine channel structure 20. As illustrated in FIG. 2, the fine droplet producing unit 10 has, for example, a structure wherein the unit is fixed onto each of planar substrates 15 made of a plastic.

As illustrated in FIG. 2, the fine channel structure 20 has a continuous phase supplying port 21 for supplying a continuous phase, a first fine channel 22 extending from the continuous phase supplying port 21, a dispersion phase supplying port 23 for supplying a dispersion phase, a second fine channel 24 extending from the dispersion phase supplying port 23, and connecting to the first fine channel 22 so as to have any angle therebetween, a third fine channel 25 connecting to the first fine channel 22 and the second fine channel 24, in which both of the continuous phase supplied from the continuous phase supplying port 21 and the fine droplets produced by feeding the dispersion phase into the continuous phase flow, and a discharging port 26 through which the continuous phase and the fine droplets flowing in the third fine channel 25 are discharged.

The fine channel structure 20 according to the present embodiment will be described by use of the so-called T-shaped structure as illustrated in FIG. 2, wherein the first fine channel 22 and the third fine channel 25 connect linearly to each other and the second fine channel 24 connects to the first fine channel 22 and the third fine channel 25 at angles of 90 degrees, respectively. However, the fine channel structure 20 according to the invention is not limited to a structure as illustrated in FIG. 2 as far as the structure 20 has a structure for producing fine droplets by feeding the dispersion phase into the continuous phase.

The fine channel structure 20 can be produced, for example, by forming ditches that will be the first to third fine channels in a surface of a first planar substrates by a well-known method (such as etching or laser working), forming through holes that will be the continuous phase supplying port, the dispersion phase supplying port and the discharging port on a second planar substrate by a well-known method (such as mechanical working or laser working), and then jointing the first and second planar substrates to make the ditches with the through holes.

The material used in the fine channel structure 20 is not particularly limited as far as the material is a material in which the ditches and the through holes can be made and further has some degree of chemical resistance. The fine channel structure 20 is made of, for example, a ceramic such as quartz, glass, $Al_2O_3$ or YAG, silicon, or a resin. The present embodiment is described about an example wherein glass is used.

As illustrated in FIG. 2, the continuous phase supplying unit 30 is constructed by a continuous phase supplying device 37 (for example, a syringe) for holding a predetermined amount of a continuous phase and further supplying the held continuous phase into the continuous phase supplying port 21 in the fine channel structure 20, for example, through a supplying pipe 33. This continuous phase supplying device 37 is provided with, for example, a non-illustrated controlling unit capable of controlling the supply amount of the continuous phase. The continuous phase held in the continuous phase supplying device 37 is made of an oily liquid containing a surfactant, as described above.

As illustrated in FIG. 2, the dispersion phase supplying unit 40 is constructed by a dispersion phase supplying device 47 (for example, a syringe) for holding a predetermined amount of a dispersion phase and further supplying the held dispersion phase into the dispersion phase supplying port 23 in the fine channel structure 20, for example, through a supplying pipe 43. This dispersion phase supplying device 47 is provided with, for example, a non-illustrated controlling unit capable of controlling the supply amount of the dispersion phase. The dispersion phase held in the dispersion phase supplying device 47 is made of an aqueous liquid containing a gelling agent to act upon cooling, and a ceramic material, as described above.

In the case of using agar as the gelling agent contained in the dispersion phase, it is preferred that a heating unit is further set up for heating, up to, e.g., about 50° C., the whole of the fine droplet producing unit 10, that is, the fine channel structure 20, the continuous phase supplying unit 30 and the dispersion phase supplying unit 40. The heating unit may be constructed by, for example, a heater 50 embedded in the planar substrates 15 illustrated in FIG. 2.

Such a structure makes it possible to prevent the dispersion phase containing the gelling agent from being solidified before fine droplets are produced in a junction 29 in the fine channel structure 20 in the case of using agar as the gelling agent contained in the dispersion phase.

As illustrated in FIG. 2, the fine droplet collecting unit 60 (hereinafter referred to merely as the collecting unit 60) is composed of, for example, fine droplets 70 produced in the fine channel structure 20, and a collecting container (for example, a beaker made of glass) for collecting a continuous phase 75 flowing together with the fine droplets 70 through a discharging pipe 65 linked to the discharging port 26 in the fine channel structure 20.

As illustrated in FIG. 2, the fine droplet cooling unit 90 is constructed by, for example, a holding container made of a metal wherein ice water 97 having ice pieces 93 for cooling the collecting unit 60 is held.

As illustrated in FIG. 2, the fine droplet washing unit 100 is composed of, for example, a non-illustrated first liquid discharging means for discharging the continuous phase 75 collected in the collecting unit 60 from the collecting unit 60, a non-illustrated solvent supplying means for supplying a solvent 105 such as ethanol into the collecting unit 60, from which the continuous phase 75 has been discharged, and a non-illustrated second liquid discharging means for discharging the solvent 105 supplied into the collecting unit 60 from the collecting unit 60.

The non-illustrated first and second liquid discharging means may be, for example, non-illustrated liquid discharging devices that each cause the collecting unit 60 to be inclined with being fixed, thereby discharging only the continuous phase 75 or the solvent 105 from the collecting unit 60.

The non-illustrated solvent supplying means is constructed by, for example, a non-illustrated solvent supplying device that is set up around the collecting unit 60 and is capable of holding a predetermined amount of the solvent and supplying the held solvent in the collecting unit 60.

Specifically, in the fine droplet washing unit 100, the continuous phase 75 collected in the collecting unit 60 is substituted with the solvent 105 (FIG. 2(a)), and subsequently the solvent 105 is discharged from the collecting unit 60 (FIG. 2(b)).

In this way, the fine droplet washing unit 100 has the first and second liquid discharging means and the solvent supplying means; thus, the continuous phase component present in the collecting unit 60, in particular, the surfactant component can be removed by these means.

The fine droplet washing unit 100 may be provided with a non-illustrated stirring means for stirring the solvent 105 after supplying the solvent 105 into the collecting unit 60 by the solvent supplying means, or a non-illustrated vibrating means for giving vibration to the collecting unit 60. By setting up such a stirring means or vibrating means, the efficiency of removing the continuous phase components present in the collecting unit 60 is improved. However, when the non-illustrated stirring means or vibrating means is set up, it is necessary to set up the stirring means or a vibrating means in order for the stirring or vibrating means not to break a spherical gel held in the collecting unit 60.

The fine droplet drying unit 120 is constructed by, for example, a non-illustrated drier for performing vacuum drying under a reduced pressure. As illustrated in FIG. 2, in the fine droplet drying unit 120, for example, the non-illustrated drier is used to evaporate the solvent 105 remaining in the collecting unit 60 completely to remove the solvent.

The fine droplet drying unit 120 may be constructed not by the drier but by a non-illustrated heater for heating the collecting unit 60.

As described above, the ceramic-fine-particle producing apparatus according to the invention has the above-mentioned structure; therefore, it is possible to produce easily ceramic fine particles which have a spherical shape close to a complete round and an excellent mono-dispersibility, and are made only of a solid component of a simple ceramic material without making the fine channel structure complicated.

It is preferred that the ceramic-fine-particle producing apparatus according to the invention further has a non-illustrated oily component coat unit for coating the fine droplets washed in the fine droplet washing unit 100 with an oily component.

The oily component coat unit is composed of, for example, a non-illustrated oily component supplying means for supplying an oily component into the collecting unit 60, and a non-illustrated third liquid discharging means for discharging the oily component supplied into the collecting unit 60 from the collecting unit 60.

The oily component supplying means is constructed by, for example, a non-illustrated oily component supplying device that is set up around the collecting unit 60 and is capable of holding a predetermined amount of the oily component and further supplying the held oily component into the collecting unit 60. The oily component referred to herein may be, for example, isoparaffin as described above.

The third liquid discharging means may be, for example, a non-illustrated liquid discharging device that causes the collecting unit 60 to be inclined with being fixed to discharge the oily component from the collecting unit 60.

EXAMPLES

The invention will be more specifically described by way of the following examples; however, the invention is not restricted by the examples.

Example 1

A ceramic-fine-particle producing apparatus as illustrated in FIG. 2 was used to produce ceramic fine particles.

The following were each supplied into a T-shaped fine channel structure having a fine channel having a width of 200 μm and a height of 200 μm and having a hydrophobic inner surface: isoparaffin containing a surfactant (sorbitan trioleate) as a continuous phase; and an aqueous liquid wherein agar and calcium phosphate powder containing primary particles having a particle diameter of 50 to 100 nm were dispersed and mixed with water as a dispersion phase. In this way, fine droplets made of the dispersion phase were produced in the fine channel structure. The produced fine droplets and the continuous phase were collected in a beaker, and then cooled by ice water to prepare a spherical gel.

Next, the continuous phase collected in the beaker was discharged, and then ethanol was supplied into the beaker to wash the spherical gel and remove the continuous phase components contained in the beaker. After the washing with ethanol, the beaker was heated to about 70° C. to evaporate ethanol component in the beaker.

Lastly, the ethanol component in the spherical gel was evaporated, and the resultant spherical ceramic formed bodies were put into a heating furnace to fire the formed bodies at 600° C. in an oxygen atmospheric gas for 1 hour, thereby producing ceramic fine particles.

Figure 3:
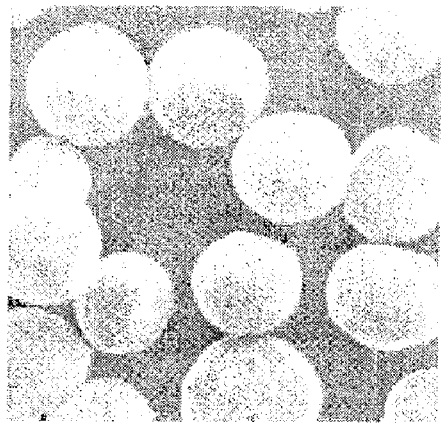
FIG. 3 is a SEM photograph of ceramic fine particles produced in Example 1.

In FIG. 3 is shown a SEM photograph of the ceramic fine particles produced in Example 1.

As illustrated in FIG. 3, it was verified that the ceramic fine particles produced in Example 1 had a spherical shape close to a complete round.

Example 2

After the washing with ethanol and before the evaporation of the ethanol component, isoparaffin containing no surfactant was supplied into the beaker to coat the washed spherical gel with isoparaffin. Thereafter, the beaker was heated to about 70° C. to evaporate isoparaffin in the beaker, thereby yielding spherical ceramic formed bodies. Lastly, the resultant spherical ceramic formed bodies were put into a heating furnace to fire the formed bodies at 600° C. in an oxygen atmospheric gas for 1 hour, thereby producing ceramic fine particles.

The others were performed in the same manner as in Example 1.

Figure 4:
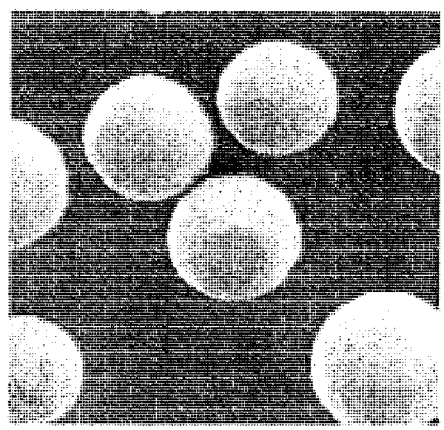
FIG. 4 is a SEM photograph of ceramic fine particles produced in Example 2.

In FIG. 4 is shown a SEM photograph of the ceramic fine particles produced in Example 2.

As illustrated in FIG. 4, it was verified that the ceramic fine particles produced in Example 2 had a spherical shape closer to a complete round than the particles in Example 1.

Comparative Example 1

Ceramic fine particles were produced in the same way as in Example 1 except that the washing with ethanol was not conducted.

As a result, at the time of producing and cooling fine droplets, the fine droplets had a spherical shape close to a complete round; however, after the fine droplets were fired, the fine particles were aggregated to each other so that ceramic fine particles having a spherical shape close to a complete round were unable to be yielded.

The invention claimed is:

1. A process for producing ceramic fine particles, the process comprising:

supplying a continuous phase and a dispersion phase into a fine channel of a fine channel structure such that the dispersion phase is fed into the continuous phase in a junction of the fine channel structure where the continuous phase and the dispersion phase are combined with each other, whereby the dispersion phase is continuously sheared so as to produce fine droplets, wherein the dispersion phase comprises an aqueous liquid containing a gelling agent to act upon cooling and a ceramic material and the continuous phase comprises an oily liquid containing a surfactant;

a step of collecting the produced fine droplets, and cooling the droplets;

a step of washing the cooled fine droplets;

a step of coating the fine droplets with isoparaffin;

a step of drying the washed fine droplets; and a step of firing the dried fine droplets.

2. The process for producing ceramic fine particles according to claim 1, wherein the gelling agent is agar.

3. The process for producing ceramic fine particles according to claim 2, wherein the production of the fine droplets is performed in a heated environment.

4. The process for producing ceramic fine particles according to claim 1, wherein the gelling agent is agar.

5. The process for producing ceramic fine particles according to claim 4, wherein the production of the fine droplets is performed in a heated environment.

6. The process for producing ceramic fine particles according to claim 1, wherein the continuous phase and the dispersion phase are separately supplied to the fine channel structure in the supplying step.

7. The process for producing ceramic fine particles according to claim 1, wherein the step of cooling the droplets is carried out after the step of collecting the droplets.

* * * * *